United States Patent [19]
Oliver

[11] Patent Number: 5,235,634
[45] Date of Patent: Aug. 10, 1993

[54] APPARATUS AND METHOD FOR ACTIVATING AN INBOUND TELEMETRY DEVICE

[75] Inventor: Stewart W. Oliver, Venice, Calif.

[73] Assignee: Telegenics, Inc., Los Angeles, Calif.

[21] Appl. No.: 627,822

[22] Filed: Dec. 14, 1990

[51] Int. Cl.$^5$ .......................................... H04M 11/00
[52] U.S. Cl. .................... 379/106; 379/102
[58] Field of Search ............. 379/106, 107, 105, 102, 379/104

[56] References Cited

U.S. PATENT DOCUMENTS

| | | |
|---|---|---|
| 3,588,357 | 6/1971 | Sellari, Jr. . |
| 3,656,112 | 4/1972 | Paull . |
| 3,868,640 | 2/1975 | Binnie et al. . |
| 3,899,639 | 8/1975 | Clevely . |
| 3,922,490 | 11/1975 | Pettis . |
| 4,180,709 | 12/1979 | Cosgrove et al. . |
| 4,213,119 | 7/1980 | Ward et al. . |
| 4,232,195 | 11/1980 | Bartelink ............................... 379/106 |
| 4,241,237 | 12/1980 | Paraskevakas et al. ............. 379/107 |
| 4,315,248 | 2/1982 | Ward . |
| 4,489,220 | 12/1984 | Oliver .................... 379/107 |
| 4,540,849 | 9/1985 | Oliver .................... 379/107 |
| 4,578,536 | 3/1986 | Oliver .................... 379/107 |
| 4,642,635 | 2/1987 | Snaper ................... 379/107 |
| 4,682,169 | 7/1987 | Swanson ............... 379/107 |
| 4,710,919 | 12/1987 | Oliver .................... 379/107 |
| 4,720,851 | 1/1988 | Smith ..................... 379/107 |
| 4,839,917 | 6/1989 | Oliver .................... 379/107 |
| 4,847,892 | 7/1989 | Shelley .................. 379/107 |
| 4,850,010 | 7/1989 | Stanbury et al. ..................... 379/102 |
| 4,862,493 | 8/1989 | Venkataraman et al. ........... 379/107 |

OTHER PUBLICATIONS

Neptune 1000, schematic diagram, undated.
Schlumberger TDI-1500 MIV-©1991.

Primary Examiner—James L. Dwyer
Assistant Examiner—Wing F. Chan
Attorney, Agent, or Firm—Mark P. Kahler

[57] ABSTRACT

An inbound telemetry device and method of operation thereof are provided in which the inbound telemetry device becomes activated should one or the other of two different events occur. The inbound telemetry device is located at a predetermined site and is coupled by a telephone line to a central host. When a real time clock within the device reaches a predetermined point in time, the device seizes the phone line and dials a predetermined telephone number and transmits collected data over the phone line to the central host or other station having a need for the information. The inbound telemetry device includes a ring counter which counts the number of rings in a particular call whether the call is from the central host or another telephone user. If the number of rings counted by the ring counter on a particular call exceeds a predetermined number of rings, then the device is activated to seize the phone line, dial the predetermined telephone number and transmit collected data from the site over the phone line to the central host.

8 Claims, 5 Drawing Sheets

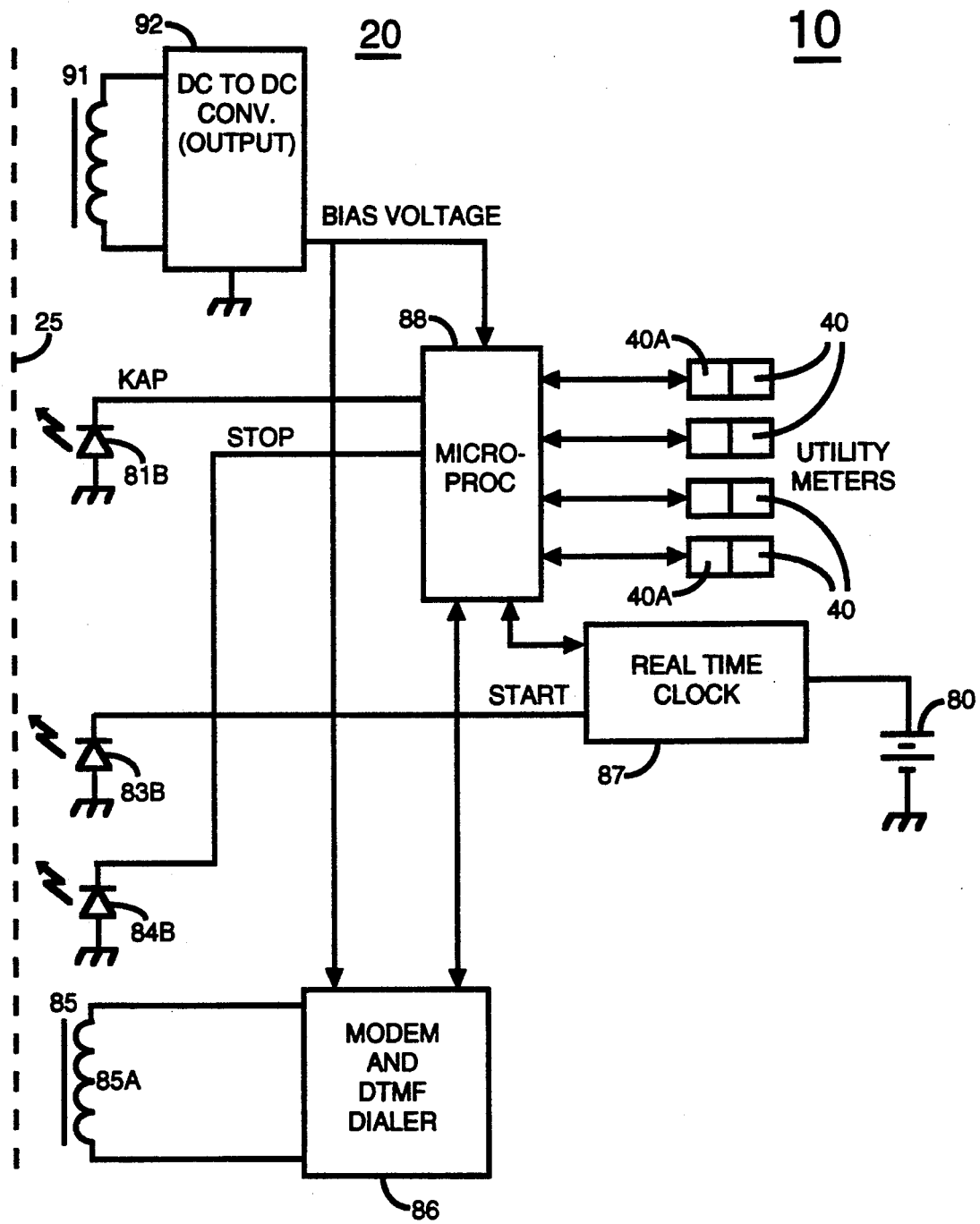

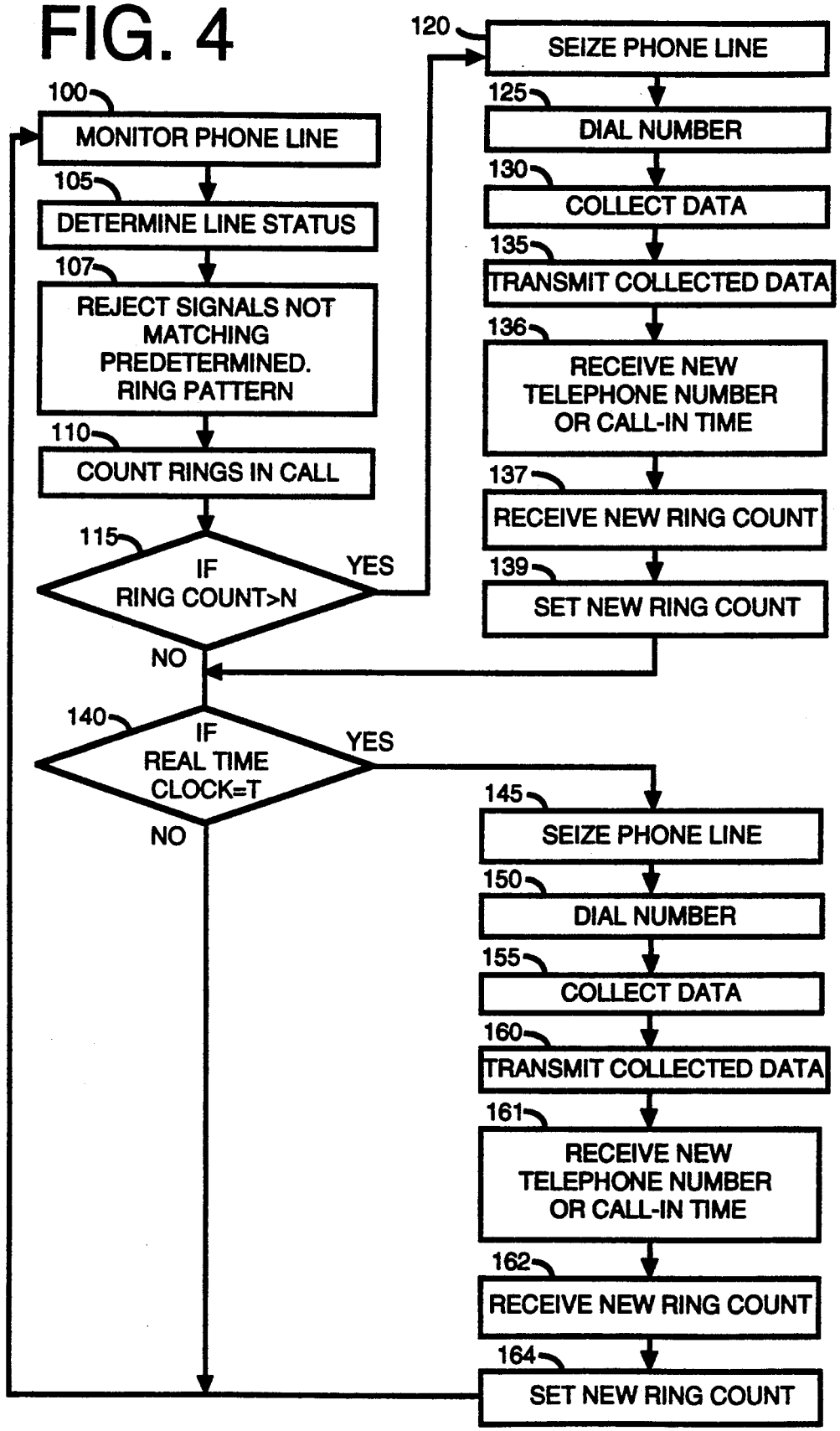

APPARATUS AND METHOD FOR ACTIVATING AN INBOUND TELEMETRY DEVICE

CROSS REFERENCE TO RELATED PATENT APPLICATIONS

This patent application is related to my copending patent applications entitled "OUTBOUND TELEMETRY DEVICE" (filed Aug. 10, 1990) and "SIGNAL PROCESSING CIRCUIT FOR USE IN TELEMETRY DEVICES" (filed Aug. 10, 1990).

BACKGROUND OF THE INVENTION

This invention relates in general to data collection systems and, more particularly, in one embodiment to an improved apparatus and method for monitoring conditions at a predetermined location and collecting data related to such conditions.

During the span of the last decade, there has been a dramatic increase in telecommunications capability on a worldwide basis. Satellite and microwave communication systems, coupled with fully digital telephone switch technology have made it possible for more and more of the world's inhabitants to have access to a telephone, and global telephone service. Indeed, in America and Western Europe almost every residence has access to affordable subscriber telephone service.

In industrialized societies, the role played by telecommunication systems becomes more and more intertwined with the daily operation of these societies. It is nearly impossible to imagine a business office without a telephone, facsimile machine or computer modem to facilitate communication with other similarly equipped offices or industrial centers. In fact, a business without these capabilities is not a viable enterprise from the very start, effectively isolated by an inability to communicate in the most cost effective manner. Therefore, that which began as a convenience evolved rapidly into an economic necessity as technology itself made it economically viable. Consequently, in the face of the ongoing revolution in telecommunications, it becomes less and less profitable to perform tasks manually if the same task can be accomplished by automated methods, particularly if the methods employed are inexpensive.

Corresponding with these developments, the science associated with design of telemetry devices and systems used to collect data from remote sites, via subscriber telephone lines, has developed into a viable technology. This is not to imply that the concept of telemetry data collection is a new idea but rather to emphasize the evolution of an entirely new industry which employs these telemetry techniques to extract the economic and pragmatic advantages gained by the novel application of such methods.

Whereas the word "telemetry" generally brings to mind the transmission of vast amounts of digital (or analog) data from spacecraft or aircraft using exotic signalling technologies, complicated sensors, and wondrous radio communication techniques, the maturation of this fledgling industry has subsequently resulted in the development of telemetry devices which are dedicated to flawless, highly reliable performance at very low costs. This new class of telemetry device is used exclusively in automatic data collection and remote monitoring (ADCARM) systems. In contrast with the readily apparent upheaval in the telecommunications industry, ADCARM systems evolved quietly from systems with initially diverse, archaic or even undefinable objectives into ones with more unified purposes, now with some form of industry standard almost certainly imminent.

Like most viable systems, automatic data collection and remote monitoring (ADCARM) systems must prosper by being more than the merits of a novel concept alone. They do this by providing vital services which cannot be economically duplicated by any other means and, in fact, they triumph when it comes to automating certain types of repetitious tasks. With the wide spread availability of telephone communications reaching to almost every home in the United States, that trend continuing worldwide, there is a natural symbiosis between ADCARM systems and the switched public telephone system to share the resources of that systems already existing infrastructure. Moreover, to encourage cooperation, ADCARM service providers offer risk free revenue incentives to the telephone company by designing telemetry equipment which transparently overlays the existing telephone network, without modification and without any degradation in subscriber telephone service. Hence, when completely installed, some ADCARM systems require only access to the "test trunk" (an existing test port on the central office switch used to test subscriber lines) while, interestingly enough, other configurations require absolutely no access to the central office facilities whatsoever. Consequently, in order capitalize upon the prominent economic advantages gained by sharing the service resources of an already existing telephone network infrastructure, successful ADCARM service providers develop low cost telemetry devices which cannot disrupt the operation of the public telephone network. These remotely located devices simply connect in parallel to the same telephone line which provides the customer with subscriber service thereby providing telemetry capability, typically from the subscriber premises. Compatibility with the existing phone system is assured by designing subservient telemetry devices which relinquish control and automatically disengage themselves under all contention scenarios where a subscriber demands telephone system resources. Since mutual compatibility is an optimal solution, this is the preferred method for implementing ADCARM systems.

There are basically two types of ADCARM systems, called "dial inbound" and "dial outbound". The "dial outbound" system is most frequently employed in automatic meter reading (AMR) systems to collect utility meter readings from customer premises while the "dial inbound" systems are used with vending machine monitors, in addition to AMR applications. The designations "inbound" and "outbound" refer to the method necessary to initiate a telemetry exchange with respect to the central control mechanism for the data system. Thus a "dial outbound" system requires the central data controller (CDC) unit to handshake with (i.e. dial out to) a remotely located telemetry device, to trigger the telemetry exchange. Conversely, a "dial inbound" system is one which "dials in" to the CDC unit under its own volition without requiring any initiating handshake. Most often, "outbound" telemetry units can be called at will since the CDC unit essentially "wakes" them up while "inbound" units, being self-activating, are only available for telemetry exchanges when they "call in" at the designated time. As one might expect, dial inbound telemetry devices often incorporate real time clocks which can be reprogrammed by the CDC unit when they "dial in" at the appointed time.

In contrast to dial inbound units, dial outbound telemetry devices are activated by sending an alerting signal to them while the subscriber line is not being used. Since this signal is designed not to ring the telephone, the user is unaware of the telemetry transaction. Upon reception of this alerting signal, typically a tone burst of specified frequency, the telemetry unit seizes the phone line and completes the telemetry exchange. This procedure, to initiate and collect telemetry data from a dial outbound unit, is very straightforward but does require access to the test trunk at the central office facility. Also in contrast with dial inbound telemetry units, which require a battery to prevent disruption of the real time clock, dial outbound devices can be designed to be completely self-powered from the phone line itself.

Essentially, the dial inbound telemetry unit, like the dial outbound device, is simply another device which plugs into the telephone jack (in addition to the subscriber telephone set) and therefore must not interfere with the operation of the telephone system. Consequently, while the subscriber telephone set is in use, the dial inbound unit cannot be allowed to go off-hook whereby it would attempt to dial over an ongoing phone call. Neither is it desirable that the device become active while the ring signal, intended to "ring" the subscriber telephone set, is present thereby erroneously "answering" an inbound phone call. Because dial inbound telemetry devices only become active at a designated time (some can be activated by an alarm signal applied to special input terminals), it is preferable to view them from a slightly different perspective than dial outbound systems, although their operating requirements are similar. Alternately stated, before a dial inbound telemetry unit becomes active, in response to an activating signal from a real time clock (or an alarm signal), it must first ascertain the status of the subscriber telephone line. If that line is currently being activated by a ring signal or is currently in use by the subscriber the dial inbound unit must wait until the line is again on-hook before it can begin its "dial in" procedure. All dial inbound devices incorporate means to provide these supervisory functions.

Although two basic types of ADCARM devices exist, there is no clear cut rules concerning which telemetry device is best suited to a particular application. In general, however, dial outbound devices are best suited to large scale applications where there is a sufficiently high density of users to justify the installation of hardware at the central office facility. In addition, since these devices can be contacted on an as required basis they are ideally suited to AMR (automatic meter reading) systems which require time-of-day readings, peak period usage, or other events which cannot be scheduled or anticipated in advance. As previously noted, dial outbound systems require access to the test trunk at the central office switch which, albeit a very simple installation procedure, requires approval from the telephone company. If this approval is not forthcoming dial inbound units must be utilized. Since these devices simply dial-in through the conventional telephone network, at a preprogrammed time, into a host computer they require no access to any of the infrastructure of the telephone system. Although dial inbound units are utilized in AMR applications they are best suited for applications which require routine or periodic telemetry exchanges. Some degree of flexibility is afforded to dial inbound units because the next "call-in" time for the telemetry device can be downloaded from the host as part of the telemetry exchange. Still, even with the ability to dynamically select the next "check-in" time, dial inbound devices are not well suited to applications requiring the random collection of telemetry data, because the device is inaccessible until it self-activates.

In certain applications, it has been found that the limitations of the dial inbound telemetry devices are of little consequence, provided that some provision is made to make such devices at least partially responsive to infrequent random access attempts or infrequent random events. Accordingly, some prior inbound devices have attempted to address the problems caused by the inherent nonresponsiveness which inbound telemetry devices exhibit toward random events. For example, some prior inbound telemetry devices can be remotely activated by first ringing the subscriber telephone set and then, after the user answered the telephone, sending an alerting signal, to which the dial inbound system is responsive, to initiate the telemetry exchange. Since the detecting means, responsive to the alerting signal, is not activated until the user takes the handset off-hook, the cooperation of the user is required. Consequently, this particular approach is not suited to applications where the dial inbound telemetry devices are connected to a dedicated telephone line, without any subscriber telephone set or the subscribers themselves to answer the telephone. (It should be noted that this approach is not a hybrid combination of dial inbound and dial outbound technologies since dial outbound units are normally anticipating the reception of an alerting signal only when the subscriber telephone line is not in use.) A further limitation of this approach is a susceptibility for the telemetry unit to be falsely activated by message (voice) traffic on the telephone line, since the device is anticipating the reception of an alerting signal while the phone set is off-hook. Still another limitation, the caller's telephone set must be specially equipped to initiate and couple both the alerting signal and the duplex telemetry data, following initial voice contact with the subscriber. Finally, although not a technical flaw, there is an added expense of designing a detector, responsive to the anticipated alerting signal, as an integral part of the telemetry device. Although the procedure is with flaws the necessity to use it is infrequent and therefore represents an acceptable compromise.

Certain applications, however, require dial inbound telemetry devices to have some local activation capabilities which the devices of the prior art lack entirely. The following example will help illustrate these limitations.

Copy machine monitors are a very good example of an actual industrial application for a dial inbound system. In the business world there exist firms whose sole function is to rent copy machines to other companies or clients. Typically, a monthly fee is charged for the copy machine and an additional fee is levied on a per page basis. In exchange for these payment terms the service provider maintains the machine, keeping it stocked with paper and toner. Some machines, like those placed in libraries or public buildings, may also have coin boxes attached to them for "pay as you go" service. Periodically, say once a month, a customer is invoiced for machine rental and usage.

This application is perfectly suited for a dial inbound system. The copy machine monitor, the remote telemetry unit, incorporates a real time clock which is programmed to activate the device at a certain date and time. At a programmed date and time, the telemetry device, which includes a digital counter to record the number of copies made on the copier, will dial a preprogrammed telephone number to down load this information to a host billing computer. Before going back to "sleep" the device may also receive a new "dial in" time and date from the host system. Conversely, in the event a local alarm condition occurs (low paper-toner, tamper alarm, etc) the telemetry unit will promptly dial into a host computer to report the alarm. Also conversely, say in the event of a paper jam, a push button on the machine may be actuated by the user to summon help. The application is similar for vending machine and pay telephone monitors, which can dial in when the coinbox becomes full or when they are being tampered with. Most devices of the prior art cannot be locally activated except by the real time clock, at the scheduled time, while only a very limited number provide input alarm terminals. Yet, both means for manually activating the dial inbound telemetry unit as well as an electronic means for random activation are very desirable.

FIG. 1 shows a simplified block diagram of a dial inbound telemetry device used for utility meter reading and is believed to be representative of a commercially available device. A further review of FIG. 1 also shows an isolation barrier used to electrically isolate the telephone line side of the telemetry unit from the utility meter side of the device. Since this protects service personnel and equipment alike, the telephone company will not permit the attachment of equipment to their telephone lines unless it provides a specified degree of isolation. To meet these isolation requirements this design uses either optocouplers, which provide optical isolation, or transformers, to provide magnetic isolation. Each isolated side of the telemetry device has a separate battery power source and each has its own independent ground. On the telephone line side of the isolation barrier, a battery is constantly providing bias voltage to the CMOS logic and the circuits which comprise the line status indicator. These are designed to use a negligible amount of power, in a quiescent mode.

On the utility meter side of the isolation barrier is a microprocessor capable of interrogating the electrically encoded meter registers, themselves attached to the bodies of the utility meters. The microprocessor is also capable of programming a real time clock, the device which will activate the dial inbound telemetry unit, and is also capable of formatting the telemetry data for transmission to the remote host. The inbound dialing and data telecommunication functions are implemented by the use of a telephone DTMF (dual tone multi-frequency) dialing device, which generates the touchtones corresponding to the numeric telephone number, and by a modem to transmit or receive telemetry data. It should be noted that the DTMF dialer, modem and real time clock are standard building block circuits which can be purchased from various integrated circuit vendors.

The operation of the dial inbound telemetry device is quite straightforward. Assuming that the device is initially in a quiescent mode (ie asleep), the relay will not be energized and the unit is, in principle, disconnected from the phone line In this mode, no circuit elements on the utility meter side of the isolation barrier are active, with the exception of the real time clock which is always operative. This real time clock is similar to the one used in digital electronic wrist watches, consuming only minuscule amounts of power and is capable of operating for at least a decade on the resident battery. At the appointed time, the real time clock will provide a start pulse which is transferred across the optocoupler to set an RS flip-flop thereby causing its Q output to transition to a logic high level. A "line status circuit" element, is designed to provide a logic high output if the telephone line is available for telemetry use. If the telephone line is available, then the output of the AND gate will set the next RS flip-flop energizing the relay. However, if the telephone line is in use or is receiving a ring signal, the AND gate will prevent the RS flip-flop from being set until such time as the telephone line is available. With an energizing signal now applied to the relay, the contacts close the subscriber loop causing the central office switch to see the phone line as off-hook, drawing loop current. This is equivalent to the subscriber taking his telephone set off-hook and receiving dial tone. The start pulse will also turn the bias circuitry on, thereby enabling the microprocessor, modem and dialing devices. Programming of the microprocessor includes a telephone number which the computer directs the DTMF dialer to dial as part of the "dial-in" procedure. While the host computer is being accessed through the public telephone network, the microprocessor reads the utility meters which are attached to its input terminals and then formats this telemetry data. The modem manages the transmission and reception of duplex data to and from the host computer. Signals from both the modem and DTMF dialer are magnetically coupled across the isolation barrier by a transformer to the telephone line. At the conclusion of the telemetry exchange the microprocessor will generate a stop pulse which turns off bias to all circuit elements on the utility meter side of the isolation barrier, with exception of the real time clock. Simultaneously, this stop pulse is also transferred across the isolation barrier by an optocoupler, resetting both RS flip-flops thereby restoring the telephone line to an idle condition by de-energizing the relay.

Although this is a very simplified approach and not all the elements of a practical dial inbound device are shown, the tutorial does demonstrate the very basic operation of the telemetry unit. In reality, a fail safe timer is usually utilized to automatically disengage the telemetry device after a fixed period of time, to prevent the device from permanently "parking" on the phone line in the event of a malfunction. The practical dial inbound device also contains circuitry to prevent it from being damaged by transients (ie lightning strikes), a diode bridge to make it insensitive to the polarity of the phone line, and usually some circuit elements to prevent nearby radio transmitters from interfering with the normal operation of the telemetry unit. Also, most likely, the mechanical relay would be replaced with a transistor switch. These elements are not shown in FIG. 1, which is intended for tutorial purposes and not for purposes of demonstrating a completed practical design, ready for installation.

In addition, the design shown in FIG. 1 represents only one possible method of implementing a dial inbound telemetry device. Each manufacturer of dial inbound telemetry unit has their own distinct philosophy as to the "proper" design philosophy for implementing these devices. While the device shown is battery powered, some devices are powered directly from the standard wall outlet rather than using batteries. Therefore the exact implementation of a dial inbound telemetry unit is a reflection of many design choices.

BRIEF SUMMARY OF THE INVENTION

It has been demonstrated in the above discussion that dial inbound telemetry systems are generally not well suited to telemetry applications which require random or pseudo-random monitoring capabilities. Fortunately, many applications only encounter infrequent requirements to manage events which cannot be scheduled in advance. By enhancing these capabilities, the inherent strengths of dial inbound systems for certain applications can be preserved.

Some dial inbound devices of the prior art incorporated means to detect an alerting signal which, when received, could initiate a telemetry exchange from the device. A major weakness with this remedy was that it required the assistance of the telephone subscriber, rendering it useless for telemetry devices on dedicated telephone lines. Other weaknesses included a requirement for a detector responsive to a predetermined alerting signal and a susceptibility to voice falsing of this detector, introduced by enabling the detector only while the subscriber telephone set is in use. Since the detector itself is entirely extraneous to the intrinsic operation of the dial inbound telemetry device, it represents extra circuitry and therefore must entail an economic penalty to implement.

Since dial inbound telemetry devices generally must incorporate means to determine when the subscriber telephone line is or is not available for use, before going off-hook to initiate a telemetry exchange, apparatus for determining the status of the telephone line is an inherent part of their design.

One object of the present invention is to provide an inbound telemetry device with a capability of random access.

Another object of the invention is to provide an inbound telemetry device in which the requirement for a detector, responsive to the alerting signal, is eliminated.

Yet another object of the present invention is to provide an inbound telemetry device with random access capability in which the assistance of the telephone user is not required.

A still further object of the invention is to provide an inbound telemetry device with random access capability which may be implemented with only a minimal amount of additional circuitry.

Also, another object of invention is to provide an inbound telemetry device which assures that true ring signals are counted rather than undesired signals.

Still another object of the invention is to provide an inbound telemetry device which is capable of distinguishing one ring pattern from another ring pattern.

In accordance with the present invention, an inbound telemetry device is provided for coupling to a telephone line which services a predetermined site, such device including a collecting apparatus for collecting information at the site. The device further includes a counter, coupled to the phone line, for counting the number of rings occurring when the line is rung. A ring count is thus determined. The device also includes activation circuitry, coupled to the counter, for activating the device to seize the telephone line and to dial a predetermined telephone number and to send the collected information over the phone line when the number of rings in the ring count exceeds a predetermined number of rings.

The features of the invention believed to be novel are specifically set forth in the appended claims. However, the invention itself, both as to its structure and method of operation, may best be understood by referring to the following description and accompanying drawings.

BRIEF DESCRIPTION OF THE DRAWINGS

FIG. 2B is a block diagram of the data collecting portion of the inbound telemetry device of the present invention.

FIG. 4 is a flow chart which depicts the method of operation of the inbound telemetry device of the present invention.

DETAILED DESCRIPTION OF THE INVENTION

Figure 1:
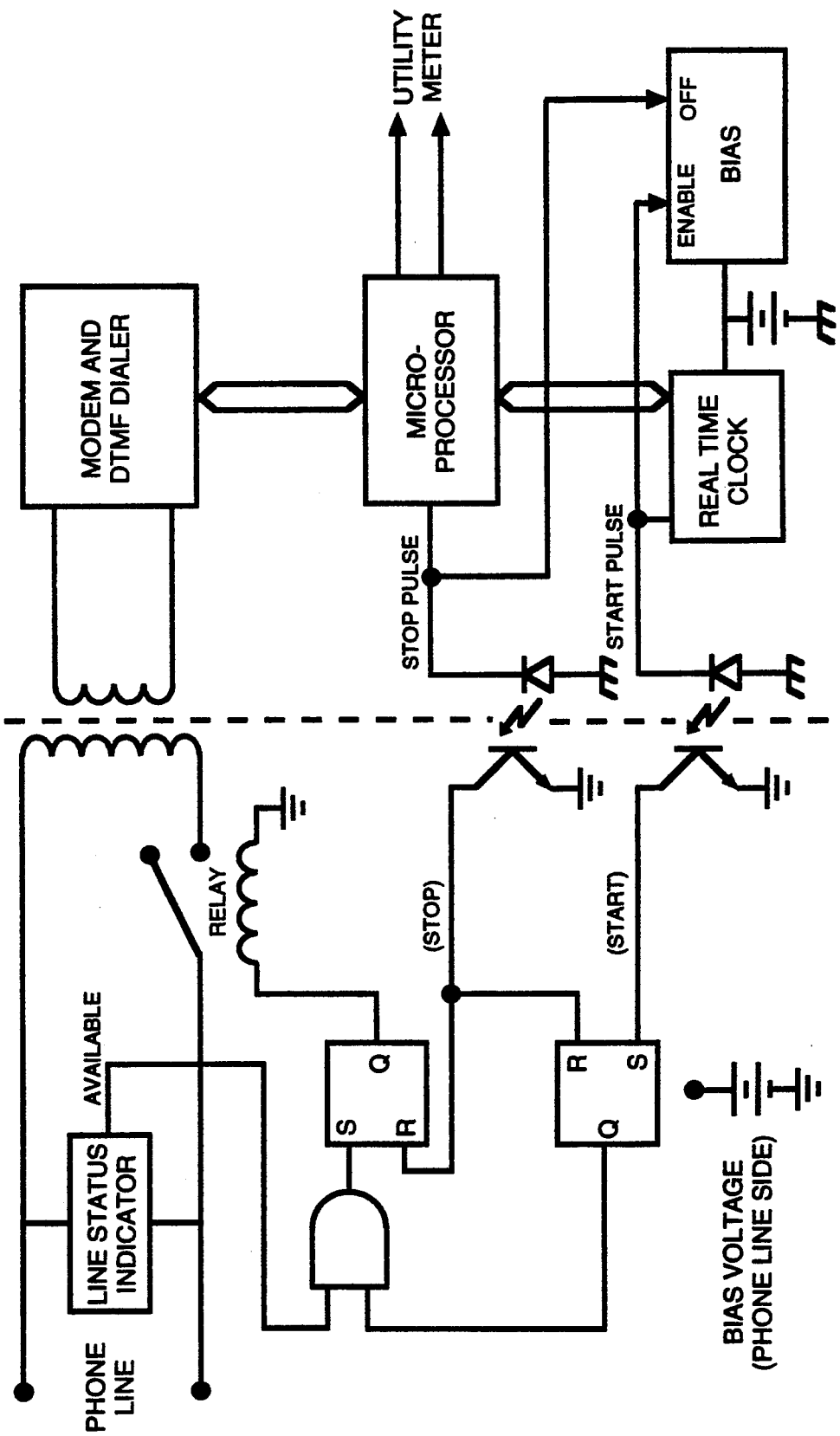
FIG. 1 is a block diagram of a conventional inbound telemetry device.

Before proceeding into a detailed description of the invention, a brief review of certain telephone interface procedures will be helpful in understanding the environment in which the invention may be employed. Upon looking into the open circuit input terminals (tip and ring) of a functional subscriber phone line, one sees a 48 volt battery in series with two resistors, representing each wire in the cable pair. The resistance in each wire or leg is typically less than 500 ohms. Therefore, if one were to attach a high impedance voltmeter to the input terminals, approximately 48 volts appears across an on-hook telephone device.

When the phone set is lifted off-hook, it shunts the normally open circuit input terminals of the phone line with a DC impedance of about 150 ohms. This causes a "loop" current to be drawn which varies from about 20 mA to 80 mA, depending upon the series impedance of the telephone line. When loop current is being drawn in this manner, indicating an off-hook telephone device, the central office switch places dial tone on the line and is responsive to a telephone number dialed by the telephone device. When the telephone transaction is completed, by placing the telephone set back on-hook, the loop current ceases and the central office switch restores the telephone line to an idle status. Therefore it is completely feasible to "line power" a telemetry device, in a standby mode, provided the current drain is less that 10 $\mu$A, to meet FCC specifications. Alternately, it is also possible to power the telemetry device from the loop current drawn while it is actively off-hook during a telemetry transaction.

To ring the telephone set, the telephone company places a 90 volt ring signal on the input terminals of that device. As will become apparent in the subsequent discussion, the characteristics of the ring signal are important in this invention as they help the remotely located telemetry device determine when the phone line is "ringing". The ring burst is a 20 Hz, 90 volt signal continuing for a period of 2 seconds. The ring burst repeats again after a 4 second delay, assuming the ringing is to continue. During the 4 second inter-ring pause, the telephone company restores the normal tip and ring voltage (48 volts) to the telephone line. Therefore, between rings normal bias voltage is restored to the dial inbound telemetry device.

Dial inbound telemetry devices, of which the present invention is an example, incorporate real time clocks in their design and are therefore "self-activating"; that is, they require no external stimulus to initiate a telemetry exchange. At a preprogrammed time, the real time clock, similar to that used in a digital wrist watch, will awaken the telemetry unit which is normally asleep in a standby mode. After dialing into a host computer system, through normal subscriber telephone circuits, the telemetry data is exchanged and, if desired, the real time clock is reprogrammed with a new "dial-in" time. The active telemetry device then releases the telephone line, returning the inbound telemetry device to the standby mode, and restoring the subscriber line to its normally idle condition.

Figure 2A:
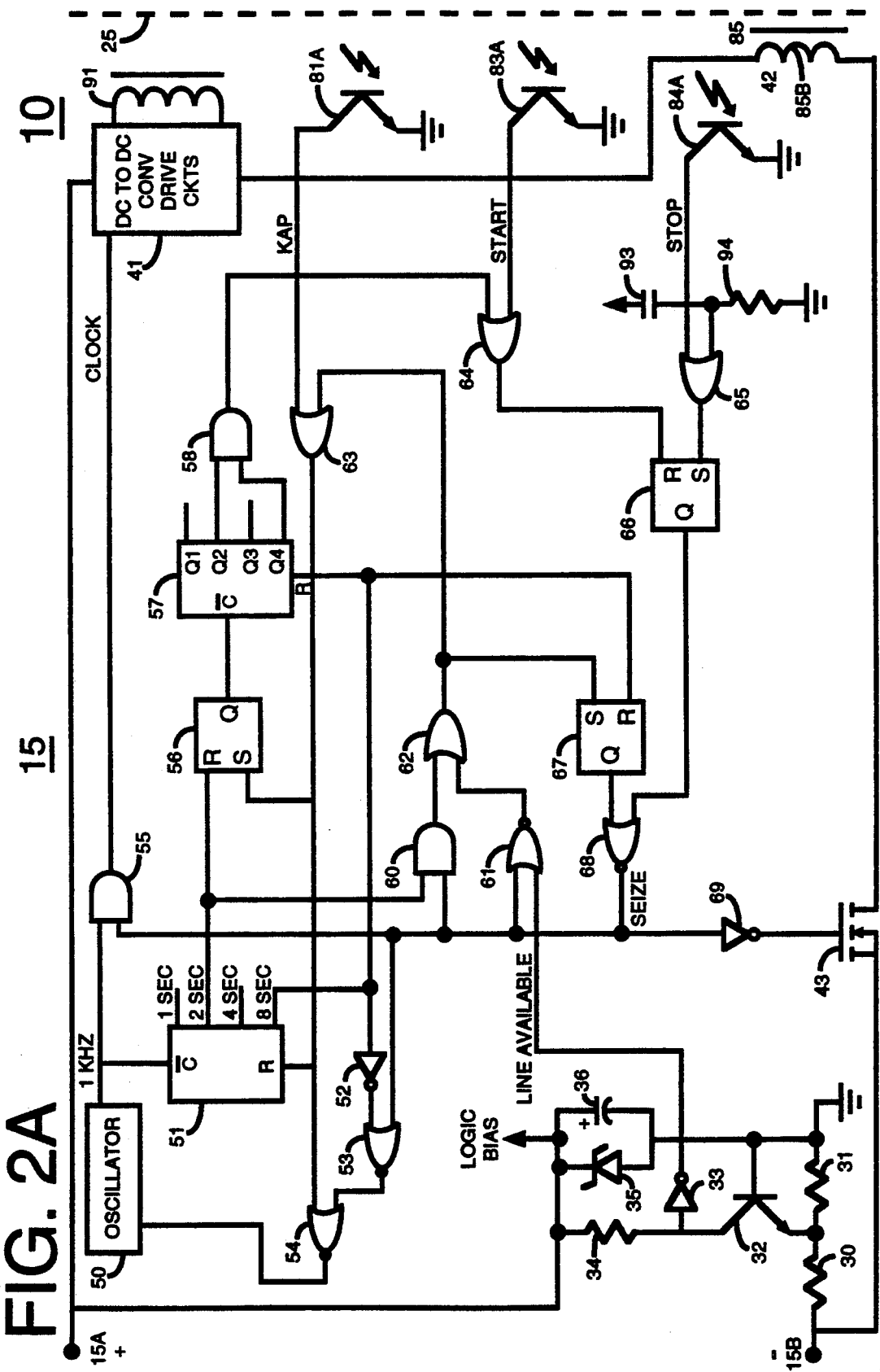
FIG. 2A is a block diagram of the control portion of the inbound telemetry device of the present invention.

A preferred embodiment of the inbound telemetry device of the present invention is shown in FIG. 2A and FIG. 2B as device 10. More specifically, FIG. 2A depicts a control portion 15 of the invention and FIG. 2B depicts a data collecting portion 20 of the invention. Control portion 15 and data collecting portion 20 are separated by an isolation barrier which is shown figuratively as 25 in FIGS. 2A and 2B. The operation of control portion 15 and data collecting portion 20 will become clear in the subsequent discussion.

Dial inbound telemetry device 10 may be employed in an automatic meter reading (AMR) system to routinely report the amount of metered commodity delivered to customer premises. That is, inbound device 10 may be employed as a meter interface unit (MIU). Alternatively, device 10 may be employed to report other collected information such as photocopying machine usage information, vending machine usage information, etc. to monitor consumption of various commodities and services dispensed by such machines. As previously noted, one goal of present invention is to overcome an inherent weakness of dial inbound telemetry devices, namely their inaccessibility until they "dial-in" to a host computer system at an appointed time.

As noted in the background of the invention, all dial inbound telemetry devices, device 10 included, need to determine the status of a subscriber telephone line before coming off-hook to initiate a telemetry exchange. Should the subscriber line be in use or should the central office switch be ringing that particular subscriber line, the telemetry device must wait until such time as the telephone line becomes available. The methods used to determine the "status" of a subscriber line are unique. Specifically, the components 30–36 depicted in FIG. 2A are one implementation of a "line status indicator" which is described and claimed in my copending patent application entitled "SIGNAL PROCESSING CIRCUIT FOR USE IN TELEMETRY DEVICES" (filed Aug. 10, 1990), the disclosure of which is incorporated herein by reference. Components 30–36 provide a means for reliably ascertaining the status of a subscriber telephone line. Essentially, resistors 30 (about 6M ohms) and 31 (about 120K ohms) set a trigger voltage for a voltage sensitive switch. When the voltage across the phone line input terminals 15A and 15B drops below 35 volts, the output from Schmitt inverter 33 will be a logic low. This occurs when a telephone set coupled across terminals 15A and 15B is off-hook or when the 90 volt, 20 Hz, ring signal swings below the 35 volt threshold. Thus, when the LINE AVAILABLE signal generated at the output of Schmitt trigger 33 is low, the telephone line is not available for use by telemetry device 10. In other words, the telephone line is presently either in an off-hook state or the line is ringing. However, if the LINE AVAILABLE signal generated at the output of Schmitt trigger 33 is continuously high for a period of time longer than the ring repetition interval (inter-ring interval), then the telephone line is available for use by telemetry device 10.

In the inbound telemetry device depicted in FIGS. 2A and 2B, which in this particular embodiment is employed to monitor utility consumption information gathered from meters, isolation is required between the telephone line and the utility meters 40, to protect both personnel and equipment. Hence, isolation barrier 25 is provided as will be discussed in more detail later. The isolation barrier 25 serves as a line of demarcation to distinguish or separate the utility meter side of telemetry device 10 (FIG. 2B—the data collection portion) from the phone line side of device 10 (FIG. 2A, the control portion).

Inbound telemetry device 10 is completely line powered, from the telephone line itself, with the exception of the real time clock 87 which cannot tolerate a disruption in bias voltage. As seen in FIG. 2B, real time clock 87 is coupled to a battery 80 to provide a permanent source of DC power thereto. Since circuit components on the utility meter side of isolation barrier 25 (see data collecting portion 20 of FIG. 2B) are not functional until DC-to-DC converter 41 drive circuit is enabled on the telephone side of the isolation barrier 25 (see control portion 15 of FIG. 2A), no standby current drain is required by data collecting portion 20. Therefore, any standby current which is drawn from the telephone line is used by the components of control portion 15 on the telephone line side of isolation barrier 25.

Now referring specifically to FIG. 2A, which shows the components of control portion 15 on the telephone line side of isolation barrier 25, tip and ring voltage (48 volts) is normally present between input terminals 15A and 15B of the dial inbound telemetry device 10, provided that the subscriber telephone line is not in use. Zener diode 35 and filter capacitor 36 establish a bias voltage for standby operation of device 10. Because the circuitry of device 10 is designed for low power operation and preferably employs CMOS logic, device 10 requires only a few microamps of current in a standby mode. Device 10 remains in such standby mode until it is actively engaged in the transmission of collected information. Such a low amount of current is easily supplied from the telephone line coupled to input terminals 15A and 15B.

While inbound telemetry device 10 is in the standby mode, awaiting activation from real time clock 87 (see FIG. 2A), power FET 43 (see FIG. 2B) is off and the current loop comprised of hybrid telephone transformer 85 and DC-to-DC converter 41 is open. Power FET 43 is only enabled when the device 10 takes the telephone line to an off-hook condition to initiate a telemetry exchange. When this occurs, device 10 is said to have become activated. In this case, the majority of the loop current pulled from the central office switch will be routed through the transformer 85 and DC-to-DC converter 41 when device 10 seizes the telephone line. Prior to this occurrence, however, the remaining logic and circuit elements of device 10 are configured to permit the device 10 to determine when the telephone line is available for use and to count the number of rings which the telephone line has received.

An advantageous feature of the present invention is that device 10 can be activated by means other than real time clock 87, namely by receiving more than a predetermined number of ring bursts on the subscriber line. In this particular embodiment of the invention, inbound telemetry device 10 is activated after receiving ten or more ring bursts. Although the actual number of rings bursts is a matter of design choice, it is preferable to set this count to a sufficiently large value so as to preclude activation of the telemetry unit within the normal caller "wait for an answer" time or the so-called "give-up" time. Typically a caller will wait for a time interval encompassing six rings (about 36 seconds) before abandoning the attempt to reach the target telephone. Thus, six rings represents a typical "give-up" time. This corresponds to approximately 36 seconds of the caller waiting for the subscriber to answer.

A telephone line is considered available for use if the subscriber telephone set is on-hook and if the telephone set is not receiving a ring signal from the central office switch. As mentioned earlier, the output from inverter 33 is a logic low only when the subscriber telephone set is off-hook and follows the 20 Hz ring signal if the subscriber line is receiving a ring signal.

The initial application of bias voltage to inbound telemetry device 10, i.e. connection to the telephone line itself, allows the logic in control portion 15 to power-up in an initially undefined state. To assure that device 10 does not instantly seize the telephone line, capacitor 93 and resistor 94 form a one-shot in conjunction with OR gate 65. This action sets RS flip-flop 66 thus forcing the Q output thereof to a logic high state, precluding activation of power FET 43 by inverter 69 via NOR gate 68.

Counter 51 is a binary ripple counter having taps at stages Q12 and Q14 which, if clocked by a 1 Khz signal at clock input C, will cause these stages (or outputs) Q12 and Q14 to transition to a logic high at 2 and 8 seconds respectively. At power-up, however, the initial condition of the counter is unknown. If the Q14 output of binary ripple counter 51 is not a logic high, assuming the telephone line is available (output of inverter 33 is a logic high), then oscillator 50 will be enabled by a logic high output from NOR gate 54. When the Q14 output of counter 51 transitions to a logic high, then oscillator 50 is disabled, causing the 1 Khz clocking signal to the counter to cease. Until counter 51 is reset by OR gate 63, the logic will remain in this state indefinitely. These are the normal initial conditions for the device 10.

Before discussing the ring counting and activation feature of inbound telemetry device 10 of the present invention, other operations in dial inbound telemetry device 10 will be discussed. Assuming that real time clock 87 has reached the predetermined time at which device 10 is to transmit collected data and also assuming that the telephone line is available for use (as indicated by a logic high output from inverter 33), then a START pulse from real time clock 87 will appear across the light emitting diode (LED) 83B of an optocoupler 83 as shown in FIG. 2B. This pulse is transferred across the isolation barrier 25, and is received by the transistor receptor 83A of optocoupler 83 in FIG. 2A, and appears as a momentary logic high pulse at the START input of OR gate 64.

This action resets RS flip-flop 66 causing the Q output thereof to transition to a logic low. Since RS flip-flop 67 is held permanently reset by the Q14 output from counter 51, the output from NOR gate 68 transitions to a logic high causing device 10 to seize the phone line by switching power FET 43 on via inverter 69. The logic high output from NOR gate 68 activates NOR gate 53 and NOR gate 61 (NOR gate 61 being coupled to OR gates 62 and 63) thereby causing both inputs of NOR gate 54 to go to a logic low. With both inputs to NOR gate 54 exhibiting being at such a logic low, the output of NOR gate 54 goes to a logic high thus enabling the 1 Khz oscillator 50. Furthermore, the seize signal (a logic high from NOR gate 68) allows AND gate 55 to provide a clocking signal to DC-to-DC converter 41. With a clocking signal thus applied, DC-to-DC converter 41 now presents a substantial load as it energizes the field winding on the transformer 91 (part of the isolation barrier 25). Almost the entire loop current from the central office switch is now drawn through power FET 43, hybrid telephone transformer 85 and DC-to-DC converter 41.

With the DC-to-DC converter operative, a bias voltage for the utility meter side of the isolation barrier appears at the output of the converter 92. Once bias voltage for microprocessor 88 is established it becomes operational, as does modem and DTMF (dual tone multi-frequency) dialer 86. About once a second a keep alive pulse (KAP) is generated by microprocessor 88 which activates LED 81A of optocoupler 81 and subsequently appears as a momentary output from the receptor transistor 81B of optocoupler 81. The periodic KAP signal resets binary ripple counter 51 repetitively thus preventing the Q12 output from ever transitioning to a logic high state, which could prematurely disengage telemetry device 10 from the telephone line if the output of RS flip-flop 67 were to transition to a logic high, via AND gate 60 and OR gate 62.

Microprocessor 88 is programmed to instruct DTMF modem/dialer 86 to touchtone dial a designated telephone number, interrogate the electrically encoded meter registers 40A (themselves attached to the bodies of the utility meters 40), format a telemetry data packet containing the information collected from registers 40A, and to transfer such data packet to modem/dialer 86 for transmission via the phone line to a host (central calling station), and finally to receive a next call-in time from the host if desired, such next call-in time being transferred to the real time clock 87 by microprocessor 88. The telemetry data (full duplex) and the DTMF touch-tone are coupled into the input 85A (FIG. 2B) of telephone hybrid transformer 85 and appear at its output 85B (FIG. 2A) on the telephone line side of the isolation barrier. Touchtones and full duplex modem data are thereby coupled to the telephone line via the telemetry exchange across the isolation barrier. It should be noted that the DTMF dialer, modem and real time clock are standard building block circuits which can be purchased from various integrated circuit vendors.

When microprocessor 88 has determined that the telemetry exchange is complete, it generates a stop pulse which is provided to optocoupler LED 84B. This pulse is coupled across isolation barrier 25 and appears as a momentary output from receptor transistor 84A. This logic high pulse sets the Q output of RS flip-flop 66 to a logic high thereby forcing the output of NOR gate 68 low. This subsequently removes the enabling signal on the gate of power FET 43, via inverter 69, causing telemetry device 10 to stop pulling loop current from the central office switch. In this manner telemetry device 10 returns to a standby condition after the normal completion of a telemetry exchange.

In the operational scenario described above it was assumed that the telephone line was available for use (refer to the output from inverter 33). Although this is true a majority of the time, it is certainly possible that the telephone line may be in use by the subscriber (causing the output from inverter 33 to be low). Had the real time clock 87 attempted to activate the dial inbound device 10 at a time when the telephone line was not available, the operational scenario would be somewhat different.

In a case where the line is not available due to a phone set or other communication device on the phone line being off-hook, the logic high output from NOR gate 61, via OR gate 62, would set RS flip-flop 67. Simultaneously, the logic high output from OR gate 62 would force the output from OR gate 63 to a logic high, holding the binary ripple counter 51 reset at zero, and would also, via NOR gate 54, disable oscillator 50. Even though the start pulse has reset RS flip-flop 66, RS flip-flop 67 has been set thereby precluding telemetry device 10 from seizing the telephone line. When the subscriber line again becomes available, the output of inverter 33 will transition to a logic high causing OR gate 63, via NOR gate 61 and OR gate 62, to release the binary ripple counter 51 and enable the oscillator 50, via NOR gate 54. However, RS flip-flop 67 cannot be reset until the Q14 from the binary ripple counter 51 transitions to a logic high state, requiring about 8 seconds for this to occur. Therefore approximately 8 seconds after the subscriber telephone set is restored to an on-hook condition, the dial inbound telemetry device 10 will seize the phone line for telemetry transmission purposes.

The telephone line is also unavailable if it is receiving a ring signal from the central office switch. Here the output of inverter 33 is a 20 Hz signal during the ring burst followed by a continuous logic high between ring bursts. The action is identical to the previous scenario except that the binary ripple counter 51 and oscillator 50 are repetitively reset while the ring burst is ongoing Between the rings counter 51 is not reset and can therefor count. Because ring bursts occur every 4 seconds, the binary ripple counter 51 is always reset before its Q14 output (which would require 8 seconds) can reset RS flip-flop 67. The only condition under which this flip-flop can be reset is when the ring signal ceases. Therefore, within 8 seconds of the last ring burst, telemetry device 10 will seize the telephone line for telemetry purposes.

An important feature of the dial inbound telemetry device of the present invention is its ability to activate for data collection and telemetry data transmission purposes after the device has received a predetermined number of ring bursts. Referring again to the ring burst scenario of the prior example, it is noted that binary ripple counter 51 was repetitively reset before the Q14 output could transition to a logic high. The first reset of this counter brought the internal state of this counter to zero, all outputs low. At the same time RS flip-flop 56 was set and four bit counter 57 was enabled because the reset input went to a logic low. Although the inter-ring time interval (4 seconds in most United States phone systems) was not long enough to allow the Q14 output of binary ripple counter 51 to transition to a logic high, except when the ring signal ceases, the Q12 output is short enough (2 seconds) to permit it to reset RS flip-flip 56 during the 4 second pause between rings.

Four bit counter 57 is clocked by a falling edge signal from the reset of RS flip-flop 56. This occurs only once between rings and four bit counter 57 is capable of recording up to 15 ring bursts. However, AND gate 58 decodes the tenth state of this counter and after ten ring bursts have been received the TEN RING DETECT signal from AND gate 58 causes RS flip-flop 66 to be reset, via OR gate 64, just as if a START pulse had been received from the real time clock 87 via receptor transistor 83B of optocoupler 83. As before, RS flip-flop 67 cannot be reset until the ring signal ceases for at least 8 seconds. Therefore, after receiving 10 or more ring bursts, the MIU will initiate a telemetry exchange shortly after the ring signal is discontinued. In such telemetry exchange, the data collected from registers 40A is transmitted over the phone line coupled to input terminals 15A and 15B.

In addition, it is quite possible to add alternate activating methods by converting OR gate 64 from a two input device to a three or greater input OR gate, or logical equivalent of a multiple input OR gate. By providing alternate activating apparatus such as a manually actuated push button or alarm terminals which couple into this OR gate, different methods can be used to initiate a telemetry transaction.

From the above discussion, it will be appreciated that inbound telemetry device 10 counts the number of rings received on the subscriber telephone line on each inbound call to the line on which such device is coupled. When a predetermined ring count is exceeded, the dial inbound telemetry device will wait until the ringing ceases and will then "dial-in" to a host system at a preprogrammed telephone number. Device 10 delays the inbound telemetry exchange of collected data until such time it is determined that the ringing signal has ceased. Normally, the ring counter is set to a sufficiently high ring count so as to effectively preclude device 10 from becoming activated until the subscriber line receives a ringing signal for an exceptionally long period of time.

Stated alternatively, the ring counter 57 is generally set to count a plurality of rings, N, namely a number of rings sufficiently large to be greater than the "give-up" time associated with human telephone callers and which was discussed briefly above. N is also referred to as the "ring count number". The "give-up" time is defined to be the time period after which the majority of telephone callers placing a call will hang up the call they are placing since it appears that the called party is not answering. It has been found that most callers give up their call attempt within approximately 6 rings which in the typical phone systems generally employed in the United States corresponds to approximately 36 seconds, assuming that each ring is for 2 seconds and that the inter-ring time interval is 4 seconds.

If when a particular inbound device 10 is being called with the intent to initiate a telemetry exchange, should the telephone subscriber or user then answer the phone before the ring counter reaches the predetermined ring count, then the user is either manually informed by an operator at the host, or automatically informed by a recorded tape or similar apparatus at the host, that such user should hang up the phone and ignore the next ringing signal. In other words, since there is no technique to preclude the subscriber or user from answering a ringing telephone set, unless a dedicated telephone line is used, the subscriber or user is merely informed to hang up the phone and ignore the next ringing signal. The particular inbound telemetry device 10 is then called a second time, and assuming no subscriber interference, would receive the designated number of rings necessary to cause device 10 to seize the telephone line and dial-in to its preprogrammed number after the cessation of the ringing signal. At this point the telemetry exchange commences between device 10 and a telemetry host equipped to collect the data from device 10. In this telemetry exchange, device 10 sends its collected data to the host and may optionally receive new call-in instructions, attributes, or parameters (new call-in time, new call-in telephone number, etc.) The calling station which initiated the call to device 10 need not necessarily be a central host, for it could as well be a repairman or other station which has a need to access the data collected by device 10.

As mentioned briefly earlier, in a preferred embodiment, the present invention advantageously employs a "line status indicator" which is described and claimed in my copending patent application entitled "SIGNAL PROCESSING CIRCUIT FOR USE IN TELEMETRY DEVICES" (filed Aug. 10, 1990) as the line status indicator formed by components 30-36 in the present invention. It is noted that this line status indicator employs a single threshold detector which is capable of both sensing the presence of a 90 volt ring signal and an off hook subscriber telephone set. Prior line status indicators employed separate ring detector circuits and on-hook/off-hook indicator circuits. Such prior ring detector circuits typically employed were generally tuned to the 20 HZ ring frequency or were activated by the "high voltage" (i.e. a voltage greater than the normal 48 volt tip and ring voltage.) to determine when the telephone line is being rung. In contrast, the line status indicator employed in the present invention advantageously employs a threshold detector which determines when the telephone line voltage for any reason goes below a predetermined threshold level which is selected to be less than the nominal 48 volt tip and ring voltage, for example, less than a 35 volts threshold level. Thus, when the 90 volt ring signal, an AC signal, momentarily swings below the 35 volt threshold or when the telephone set is taken off hook such that the line voltage drops swings below that threshold, the threshold detector of the line status indicator is activated to indicate that the telephone line is not available. In this manner, if either the telephone line is being rung or the subscriber telephone set is off hook, the "line available" signal at the output of line status indicator 30-36 gives an indication that the telephone line is not available. A line status signal having a logic high at the output of inverter 33 indicates that the line is available whereas if the line status signal exhibits a logic low this indicates that the phone line is not available.

The inbound telemetry device of the present invention advantageously utilizes the line available/line not available signal (line status signal) at the output of line status indicator 30-36 to reliably ascertain when the telephone set is ringing. More specifically, the inbound telemetry device is capable of discriminating and effectively rejecting line signals other than a true ring signal. In each telephone system, the particular ring signal burst duration and the inter-ring time interval selected for that system result in a ring signal which exhibits a characteristic signature. Together, the ring burst and the following inter-ring pause comprise a ring cycle. The ring cycle is repeated as long as ringing is being conducted.

For example, many conventional telephone systems in the United States employ a ring cycle having a 2 second ring burst followed by a 4 second pause time interval. The ring cycle is repeated for as long as ringing is desired. It is thus seen that a particular ring signal exhibits timing characteristics or a ring pattern signature which enable it to be distinguished from other signals which may be present on the phone line.

The inbound telemetry device of the present invention monitors the ring signal for the unique timing characteristics or ring pattern signature associated therewith and permits ring counter 57 to be incremented only when the particular expected ring pattern signature is in fact detected.

It was shown in earlier discussion that a prominent objective for inbound telemetry devices is to make them as transparent as possible to the telephone network. It is clearly desirable to design these devices to minimize, if not completely eliminate, possible interference with the operation of the subscriber telephone system. In inbound telemetry devices which do not employ the ring pattern signature recognition apparatus of the present invention, it may be possible to undesirably falsely activate such telemetry device. For example, it is not acceptable for a subscriber to falsely activate the telemetry device by pulsing the switch-hook of the phone (i.e. repetitively pressing and releasing the switch-hook on the subscriber telephone set). The utilization of the signature recognition technique of the present invention significantly reduces the likelihood of falsing from such causes.

The line status indicator circuit (components 30-36) provides an indication of "line available" or "line not available". The pattern of line available/line not available signals resulting from a ring signal is actually what is monitored by the telemetry device to determine if a characteristic ring pattern is present on the phone line. Once processed by the line status indicator circuit, the ring signal becomes a pattern of alternating "line not available" bursts (indicates ring burst) and "line available" bursts (indicates inter-ring pause.

The telemetry device of the present invention may be employed to monitor the phone line for different characteristic ring patterns which are employed by different telephone systems. As mentioned earlier, a typical U.S. system employs a ring pattern having a ring cycle with a 2 second ring burst followed by a 4 second inter-ring pause and then another 2 second ring, and so forth. When configured to operate in such a telephone system, one embodiment of the inbound telemetry device of the invention monitors for the above described ring pattern by monitoring for a line status signal of "line not available" (ringing) followed by 2-8 seconds of "line available" (not ringing) and so forth repeating.

In the above example, it may be said that the telemetry device has monitored for the characteristic ring pattern by employing a search template wherein the searched for signal exhibits "line not available" (ringing) followed by 2-8 seconds of "line available" (not ringing).

An example of a signal which would be accepted by the telemetry device as a valid ring signal under the above template is a ring signal exhibiting a 2 second burst followed by a 4 second inter-ring pause. The rings of such a ring signal would be counted by counter 57.

An example of a signal which would violate the above template is a ring signal exhibiting a ring burst followed by a 1.5 second inter-ring pause. Such a ring signal would be regarded as being invalid by the inbound telemetry device and counter 57 would be reset before it reached the 2 second point. For this reason, none of the rings of such an invalid ring signal would be counted by counter 57 of inbound telemetry device 10.

In another example, the template may be somewhat altered to search for the characteristic ring pattern by employing a search template wherein the searched for signal exhibits "line not available" (ringing) followed by 3-8 seconds of "line available" (not ringing). A template of "line not available" followed by "line available" for greater than 4 seconds up to 8 seconds (>4-8 seconds) would not be effective however since the inter-ring pause is 4 seconds long and would not be detectable under this template.

An example is now given of how the inbound telemetry device can be readily adapted to recognize a ring pattern signature other than the typical U.S. ring pattern discussed above. For purposes of the following discussion, it is assumed that the ring signal exhibits a 7 second ring cycle which includes a 2 second ring followed by a 5 second pause (inter-ring time interval), and so forth in repetition. A template which may be used by the inbound telemetry device to recognize such ring pattern is for example a template wherein the device monitors the phone line for a ring followed by an inter-ring pause of greater than 4 second but less than 8 seconds. To provide such a ring pattern search template, the connections to counter 51 would have to be modified as follows: The connection between the R input of ring counter 57 and the input of inverter 52 and tap Q14 (8 second tap) of counter 51 would have to be changed to couple such R input and inverter 52 input to tap Q13 (4 second tap).

From the above discussion it will be appreciated that the signal of the ring signal has been analyzed and processed for each ring burst in order to clock ring counter 57. As noted earlier, the integral nature of the "line status indicator circuit" (components 30–60) which combines both ring detector and off-hook sensing functions, facilitates the recognition of the distinctive ring pattern. In this case, the ring signature has been shown to be a "line not available" signal followed by a "line available" signal (inter-ring pause) equal to or greater than 2 seconds but not exceeding 8 seconds. While this is a relatively simple signature, those skilled in the art will appreciate that the degree of signature conformity can be made more or less stringent in accordance with application requirements. Furthermore, by changing the signature requirement the inbound telemetry unit can be made responsive to special ring signals used solely to activate that device. Stated alternatively, appropriate selection of the ring pattern can provide the inbound telemetry device with a capability of rejecting or ignoring some ring signals in favor of another.

Another embodiment of the inbound telemetry device of the present invention is capable of receiving ring count information from the host over the phone line and using that ring count information to effectively set or reset the ring count associated with the ring counter. In this manner, the number of rings which device 10 counts before seizing the phone line may be remotely programmed should it ever be desired to change the ring count number associated with counter 57 from its original value (10 rings in the above example) to another number of rings.

Figure 3:
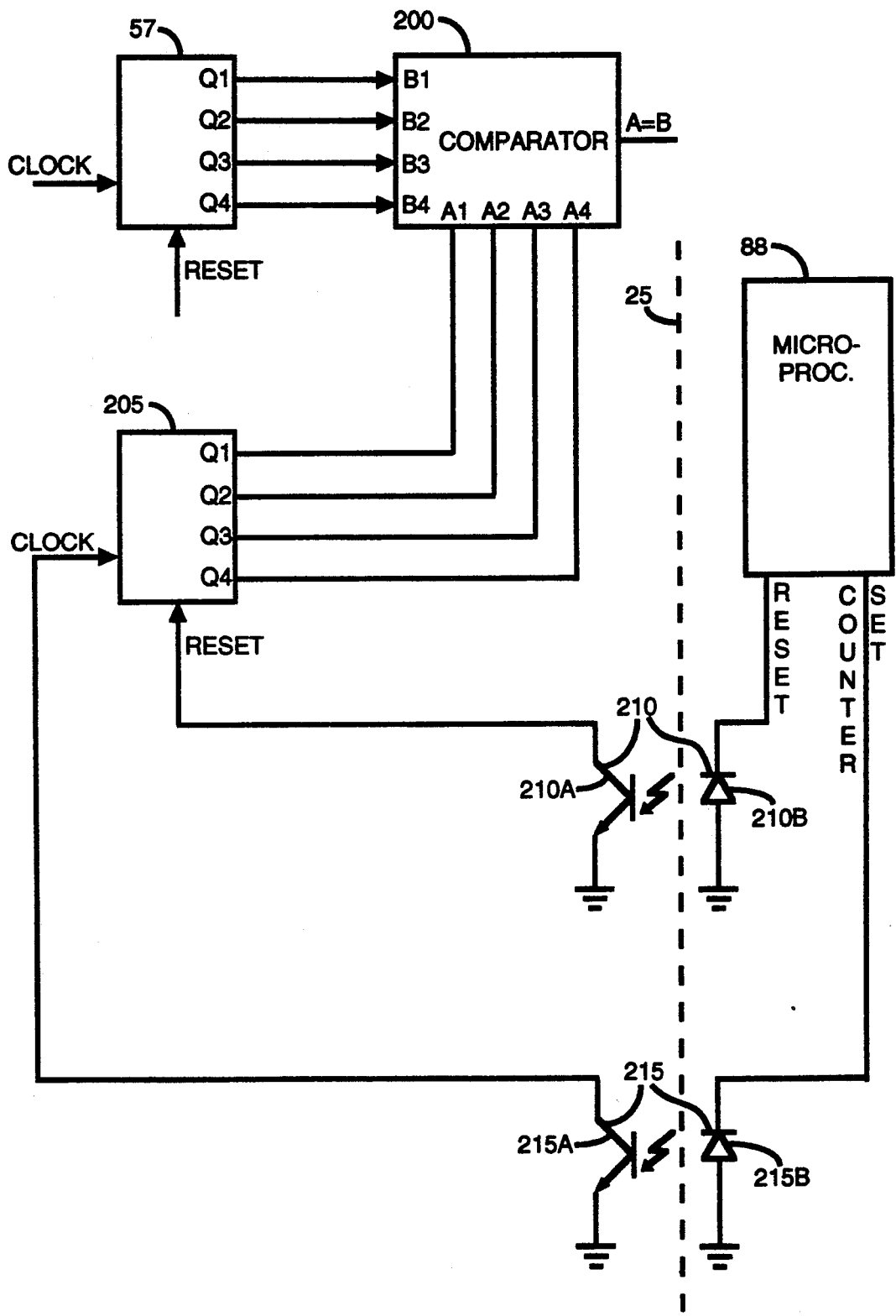
FIG. 3 is a block diagram of a portion of the inbound telemetry device modified to receive new ring count information.

Rather than redrawing the entirety of FIGS. 2A and 2B to include the aforementioned ring count reprogramming feature of the invention, FIG. 3 shows those portions of device 10 of FIGS. 2A-2B which are modified to include this feature. Like numbers are used to indicate like elements in the inbound telemetry device of FIG. 3 as compared with device 10 of FIGS. 2A and 2B. It will be recalled that counter 57 of device 10 of FIG. 2A effectively counts the number of rings in an incoming call. When counter 57 counts 10 rings (ie. 10 "line not available" signals processed), then both outputs Q2 and Q4 of ring counter 57 go high. This event (both Q2 and Q4 of counter 547 being high) is detected by AND gate 58 which then produces a logic high at its output to indicate detection of 10 rings. Device 10 then seizes the phone line and communicates collected information over the phone line to the host in the manner described earlier. The invention is not limited to an inbound telemetry device which counts 10 rings, but rather is readily adapted to count other numbers of rings.

It is most advantageous to be able to remotely program the inbound telemetry device with new ring count information as provided in the modifications to device 10 shown in FIG. 3, for example. In the inbound telemetry device of FIG. 3, AND gate 58 is eliminated and a 4 bit comparator 200 is employed in its place. One comparator which is suitable for use as comparator 200 is the Model 74HC85 manufactured by Motorola, Inc. Comparator 200 may also be referred to as an arithmetic logic unit. Comparator 200 includes comparison inputs A1, A2, A3 and A4 which are compared with inputs B1, B2, B3 and B4. When inputs A1, A2, A3 and A4 respectively exhibit the same logic states as inputs B1, B2, B3 and B4, then comparator 200 generates a logic high output (ie., when A=B). The output of comparator 200 is coupled to the same input of OR gate 64 as was the output of NAND gate 58 in device 10 of FIG. 2A. Inputs B1, B2, B3 and B4 of comparator 200 are coupled to outputs Q1, Q2, Q3 and Q4, respectively of ring counter 57.

The modified telemetry device shown partially in FIG. 3 includes a slave counter 205 which is substantially similar to ring counter 57 and which includes its own outputs Q1, Q2, Q3 and Q4, as shown. The isolation barrier 25 of device 10 is still shown as 25 and microprocessor 88 is still shown as 88 in the modifications depicted in FIG. 3. Microprocessor 88 includes a RESET output which is coupled via an optocoupler 210 to a RESET input of slave counter 205. Microprocessor 88 further includes a COUNTER SET output which is coupled via an optocoupler 215 to the CLOCK input of slave counter 205. Optocouplers 210 and 215 perform an isolative function similar to the isolative function served by optocouplers 83 and 84 of FIGS. 2A and 2B.

To illustrate the operation of the modified circuitry of FIG. 3 with respect to its capability of reprogramming the ring count N associated with the inbound telemetry device, it is assumed for purposes of example that real time clock 87 has reached a predetermined call-in time. It is further assumed that the telemetry device has seized the phone line, called into the host and sent the collected information over the phone line to the host. At this point in time, the host computer (not shown) may optionally send ring count information to the telemetry device, such information instructing microprocessor 88 as to a new ring count number, N. The ring count information (new ring count number) is received by device 10 and is communicated via modem 86 to microprocessor 88. To actually effect a change in the ring count number, N, associated with device 10, microprocessor 88 issues a reset pulse at its RESET output as shown in FIG. 3. This RESET pulse causes slave counter 205 to be reset. Microprocessor 88 then issues a COUNTER SET signal at its COUNTER SET output, such COUNTER SET signal including a number of pulses equal to the new ring count number, N. Slave counter 205 then counts up to the new ring count number N and provides the count at its outputs Q1, Q2, Q3 and Q4. For example, assuming that the original ring count number was 10 and that the new ring count number is 12, slave counter 205 will count the 12 pulses issued by microprocessor 88 and set counter 205 outputs Q4 and Q2 high (logic 1). Such outputs Q4 and Q2 being high corresponds to a 12 count.

When the next call is placed to inbound telemetry device 10, device 10 counts the rings in that call. More specifically, counter 57 will count the rings of the call and when comparator 200 determines that the count of counter 57 is equal to the count of slave counter 205 (i.e. equal to 12 in this example), then the output of comparator 200 will toggle indicating that the new ring count N has been reached by the present incoming call. Then inbound telemetry device 10 seizes the phone line and communicates the collected information in the manner described earlier.

While an inbound telemetry device apparatus has been described above, it will be appreciated that a method for operating an inbound telemetry device has also been described. The device employed in the method is coupled to a telephone line at a predetermined site. The method includes the step of collecting information at the site. The method further includes the step of counting the number of rings which occur when the line is rung to determine a ring count. The method still further includes the step of the device activating to seize the phone line and to dial a predetermined telephone number and to send the information on the phone line when the number of rings in the ring count exceeds a predetermined number of rings.

The flow chart of FIG. 3 summarizes the practice of the method of the present invention. It is noted that microprocessor 88 is appropriately programmed to control the operation of device 10 in accordance with the flow chart of FIG. 4. In a preferred embodiment of the invention, a microcontroller which includes both ROM and RAM therein is employed as microprocessor 88. The actual control program instructions necessary to implement the flow chart of FIG. 4 are stored in the ROM within microcontroller 88. Temporary storage is provided by the RAM within microcontroller 88.

Operation of inbound telemetry device 10 starts by device 10 monitoring the phone line as per block 100. The status of the phone line is then determined at block 105 where a determination is made whether the phone line is available or not available. For purposes of the invention, when the line status signal indicates "line not available" then the line is assumed to be ringing and when "line available" is indicated the line is assumed not to be ringing (inter-ring pause).

As per block 107, the rings from any ring pattern which does not substantially match the predetermined ring pattern of the particular phone system are rejected or otherwise ignored. When the rings of an incoming call start to be received, the rings are counted as per block 110 provided the ring pattern of those rings substantially matches the predetermined ring pattern. A ring count is thus determined.

A decision is made at block 115 to determine if the ring count found at block 110 exceeds a predetermined number of rings (ring count number), N, which is a number of rings set to be sufficiently high to span a time greater than the give-up time as explained earlier. If the ring count exceeds the programmed ring count number N for a particular call, then device 10 seizes the phone line as per block 120 and dials a predetermined telephone number as per block 125. Device 10 then collects data at the site as per block 130 and transmits the collected data over the phone line to a host computer as per block 135. If desired, the host can send a new predetermined call-in telephone number (another host's telephone number) for storage and later use by device 10. As indicated at block 136, device 10 receives this telephone number and appropriately stores it for later use. Also, if desired, the host can send device 10 a new predetermined call-in time at which device 10 should call into the host in the future. As indicated at block 136, device 10 receives this new call-in time and programs real time clock 87 with the new call-in time.

As indicated at block 137, device 10 monitors the phone line to receive a new ring count number, N, from the host should it become desirable to reprogram device 10 with a new ring count number, N. The host computer (not shown) is capable of sending such a new ring count number N (ring count information) over the phone line to device 10 when device 10 calls in to the host. As previously described in detail, the ring count number N associated with device 10 then becomes reprogrammed (see block 139) with the new ring count number N which is downloaded from the host.

It is noted that the steps of the method of the invention need not necessarily occur in the order described herein. For example, the collecting data step of block 130 could occur before or during the dialing the phone number step of block 125.

Flow then continues to decision block 140. It is noted that after decision block 115, flow also continues directly to decision block 140 if a determination was made at decision block 115 that the ring count of a particular call did not exceed the ring count number N. A determination is made at decision block 140 as to whether or not the present time on the real time clock in device 10 is equal to the appointed time, T, at which device 10 is programmed to call into the host. If it is presently the appointed time, then device 10 seizes the phone line as per block 145 and dials a predetermined telephone number as per block 150. Device 10 then collects data at the site as per block 155 and transmits the collected data to a host as per block 160.

In a manner similar to that indicated in block 136, if desired the host can send a new predetermined call-in telephone number (the host's telephone number) for storage and later use by device 10 as indicated at block 161. Device 10 receives this telephone number and appropriately stores it for later use. Also, if desired, the host can send device 10 a new predetermined call-in time, T, at which device 10 should call into the host in the future. As indicated at block 161, device 10 receives this new call-in time and programs real time clock 87 with the new call-in time.

As indicated at block 162, device 10 monitors the phone line to receive a new ring count number, N, from the host should it become desirable to program device 10 with a new ring count number, N. The ring count number N associated with device 10 then becomes reprogrammed (see block 164) with the new ring count number N which is downloaded from the host. Flow then continues back to block 100 at which inbound telemetry device 10 again commences monitoring the phone line. Again, it is noted that the steps of the method need not necessarily occur in the above stated order.

The foregoing describes an apparatus and method for activating an inbound telemetry device. The apparatus and method disclosed provides for the capability of random access. Moreover, in the present device, the requirement of a detector which is responsive to the alerting signal is eliminated. Advantageously, the intervention of the telephone user is not required in this apparatus and method for activating an inbound telemetry device.

While only certain preferred features of the invention have been shown by way of illustration, many modifications and changes will occur to those skilled in the art. It is, therefore, to be understood that the present claims are intended to cover all such modifications and changes which fall within the true spirit of the invention.

I claim:

1. A method for operating an inbound telemetry device which services a predetermined first location by monitoring conditions at said first location and reporting information regarding said conditions back to a central station situated at a second location which is remote from said first location, said method comprising the steps of:

collecting information at said site;
   dialing inbound to said central station over said phone line to report said information to said central station at predetermined times;
   counting at said first location the number of ring bursts occurring when said telephone line is rung to determine a ring count;
   determining when the number of rings counted in said ring count exceeds a predetermined plurality of ring bursts which occur during a typical give-up time;
   determining when the ring bursts on said telephone line have ceased;
   dialing inbound to said central station over said telephone line when it is determined that the number of ring bursts counted in said counting step exceeds said predetermined plurality of ring bursts which occur during a typical give-up time, the dialing in-bound action of this dialing step being delayed to occur a predetermined amount of time after the cessation of ringing, and
   transmitting said information to said central station after said dialing step.

2. The method of claim 1 including the step of resetting said ring count to 0 when said information is sent on said telephone line.

3. The method of claim 1 wherein said predetermined plurality of ring bursts which occur during a typical give-up time is about six rings.

4. The method of claim 1 wherein said typical give-up time is approximately 36 seconds.

5. An inbound telemetry device for coupling to a telephone line which services a predetermined first location for monitoring conditions at said first location and for reporting information regarding said conditions over said phone line back to a central station situated at a second location which is remote from said first location, said device comprising:

collecting means for collecting information at said site;
   real time clock means for causing said telemetry device to dial inbound to said central station over said phone line to report said information to said central station at predetermined times;
   ring detecting means, coupled to said phone line, for detecting ring bursts on said telephone line at said first location;
   counting means, coupled to said ring detecting means, for counting the number of ring bursts occurring when said telephone line is rung
   first determining means, coupled to said counting means, for determining when the number of ring bursts counted by said counting means exceeds a predetermined plurality of ring bursts which occur during a typical give-up time;
   second determining means for determining when the ring bursts on said telephone line have ceased;
   dial-in means, coupled to said first determining means and said second determining means, for dialing inbound to said central station over said telephone line when said first determining means determines that the number of ring bursts counted by said counting means exceeds said predetermined plurality of ring bursts which occur during a typical give-up time, said dial-in means being activated to dial into said central station a predetermined amount of time after the ring bursts on said telephone line have ceased as determined by said second determining means, and
   transmitting means, coupled to said dial-in means, for sending said information to said central station over said phone line after such dialing.

6. The inbound telemetry device of claim 5 further comprising resetting means, coupled to said counting means, for resetting said counting means to 0 when said information is sent on said telephone line.

7. The inbound telemetry device of claim 5 wherein said predetermined plurality of ring bursts which occur during a typical give-up time is about six rings.

8. The inbound telemetry device of claim 5 wherein said typical give-up time is approximately 36 seconds.

* * * * *